US012762215B2

(12) United States Patent
Borkovac et al.

(10) Patent No.: US 12,762,215 B2
(45) Date of Patent: Oct. 13, 2026

(54) METHODS AND DEVICES FOR CONTROLLING ACCESS TO A SOFTWARE ASSET

(71) Applicants: Dolby Laboratories Licensing Corporation, San Francisco, CA (US); Dolby International AB, Dublin (IE)

(72) Inventors: Aleksandar Borkovac, Nuremberg (DE); Malte Schmidt, Feucht (DE); Paul F. Griepentrog, San Francisco, CA (US)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 136 days.

(21) Appl. No.: 18/573,379

(22) PCT Filed: Jun. 27, 2022

(86) PCT No.: PCT/US2022/035081
§ 371 (c)(1),
(2) Date: Dec. 21, 2023

(87) PCT Pub. No.: WO2023/278298
PCT Pub. Date: Jan. 5, 2023

(65) Prior Publication Data

US 2024/0338426 A1 Oct. 10, 2024

Related U.S. Application Data

(60) Provisional application No. 63/216,985, filed on Jun. 30, 2021.

(51) Int. Cl.
*G06F 21/12* (2013.01)
*G06F 21/10* (2013.01)
*H04L 9/32* (2006.01)

(52) U.S. Cl.
CPC ........ *G06F 21/121* (2013.01); *G06F 21/1014* (2023.08); *H04L 9/3247* (2013.01)

(58) Field of Classification Search
CPC ........................... G06F 21/121; G06F 21/1014
See application file for complete search history.

(56) References Cited

U.S. PATENT DOCUMENTS 6,223,291 B1 * 4/2001 Puhl .................... H04L 63/0823 726/28
9,781,122 B1 10/2017 Wilson
(Continued)

OTHER PUBLICATIONS

Anonymous: "OAuth—Wikipedia," Jun. 5, 2021 (Jun. 5, 2021), XP055968800, Retrieved from the Internet: URL:https://de.wikipedia.org/w/index.php?t itle=OAuth&oldid=212703586 [retrieved on Oct. 7, 2022], p. 2-p. 4, 12 pages.
(Continued)

*Primary Examiner* — David J Pearson

(57) ABSTRACT

The present document describes a method (900) for controlling access to a software asset of a software program, which is executed on an electronic device (110). The method (900) comprises, on one or more software provider servers (120), receiving (902) a request for authentication from a service provider server (210); upon successful authentication, providing (904) an authentication token to the service provider server (210); receiving (906) a request for a feature access token from the service provider server (210); and in reaction to the request, providing (908) the feature access token to the service provider server (210).

19 Claims, 12 Drawing Sheets

(56) References Cited

U.S. PATENT DOCUMENTS

| | | | | |
|---|---|---|---|---|
| 2003/0156719 | A1* | 8/2003 | Cronce | G06Q 20/3674 380/256 |
| 2003/0159035 | A1* | 8/2003 | Orthlieb | G06F 21/121 713/168 |
| 2005/0102240 | A1* | 5/2005 | Misra | G06Q 30/06 705/59 |
| 2012/0084565 | A1 | 4/2012 | Wittenberg | |
| 2015/0312038 | A1* | 10/2015 | Palanisamy | G06Q 20/385 713/155 |
| 2016/0092696 | A1 | 3/2016 | Guglani | |
| 2016/0285874 | A1 | 9/2016 | Smith | |
| 2018/0260536 | A1* | 9/2018 | Peza Ramirez | G06F 21/105 |
| 2019/0312730 | A1* | 10/2019 | Engan | H04L 63/126 |
| 2019/0312733 | A1 | 10/2019 | Engan | |
| 2021/0012343 | A1 | 1/2021 | Theodoro | |
| 2021/0067341 | A1 | 3/2021 | Haque | |
| 2021/0099449 | A1 | 4/2021 | Frederick | |
| 2021/0152372 | A1* | 5/2021 | Hunt | H04L 67/02 |
| 2021/0160231 | A1 | 5/2021 | Kumar | |
| 2022/0255944 | A1* | 8/2022 | Chan | H04W 12/72 |

OTHER PUBLICATIONS

Hardt Ed: "RFC6749: The OAuth 2.0 Authorization Framework", Oct. 1, 2012 (Oct. 1, 2012), XP093026398, Retrieved from the Internet: URL:https://www.rte-editor.org/rfc/pdfrfc/rfc67 49. txt. pdf, [retrieved on Feb. 23, 2023] , 76 pages.

Jones Microsoft D Hardt Independent M: "The OAuth 2.0 Authorization Framework: Bearer Token Usage; rfc6750.txt", The OAuth 2.0 Authorization Framework: Bearer Token Usage; RFC6750.txt, Internet Engineering Task Force, IETF; Standard, Internet Society (ISOC) 4, Rue Des Falaises CH-1205 Geneva, Switzerland, Oct. 13, 2012 (Oct. 13, 2012), pp. 1-18, XP015086449, [retrieved on Oct. 13, 2012] , 18 pages.

* cited by examiner

METHODS AND DEVICES FOR CONTROLLING ACCESS TO A SOFTWARE ASSET

CROSS-REFERENCE TO RELATED APPLICATIONS

This application is a U.S. National Stage application under U.S.C. 371 of International Application No. PCT/US2022/035081, filed on Jun. 27, 2022 which claims the priority benefit of U.S. Provisional Patent Application No. 63/216,985, filed Jun. 30, 2021, the contents of which are hereby incorporated in its entirety.

TECHNICAL FIELD

The present disclosure generally relates to software distribution, and more specifically to techniques for managing authorization and usage of software assets.

BACKGROUND

Signed security tokens (e.g., JSON Web Tokens or JWTs) may be used for authorizing calls to application programming interfaces (APIs). In such applications, token validation is performed on a server separate from a known device making a call to a respective API.

The present document addresses the technical problem of controlling access to and/or usage of a software asset (e.g., for an API) in an efficient and reliable manner for unknown client devices. The technical problem is solved by each one of the independent claims. Preferred examples are described in the dependent claims.

SUMMARY

According to an aspect, a method for controlling access to a software asset of a software program, which is executed on an electronic device, is described. The software program may be provided by a service provider. The method comprises, on or by one or more software provider servers (i.e. on or by one or more computing devices which are referred to herein as software provider servers), receiving a request for authentication from a service provider server (i.e. from a computing device referred to herein as service provider server); upon successful authentication, providing an authentication token to the service provider server; receiving a request for a feature access token from the service provider server; and in reaction to the request, providing the feature access token to the service provider server; wherein the feature access token may enable the service provider server to provide access to the software asset to one or more electronic devices (notably, client devices) which are (communicatively) coupled to the service provider server (via a communication network).

According to a further aspect, a method for controlling access to a software asset of a software program, which is executed on an electronic device, is described. The software program may be provided by a service provider. The method comprises, on or by a service provider server, requesting authentication from one or more software provider servers; in reaction to this (i.e., subject to requesting authentication), receiving an authentication token from the one or more software provider servers; in reaction to this (i.e., subject to receiving the authentication token), requesting a feature access token from the one or more software provider servers; wherein the feature access token may enable the service provider server to provide access to the software asset to one or more electronic devices which are coupled to the service provider server; in reaction to this (i.e., subject to requesting the feature access token), receiving the feature access token from the one or more software provider servers; and providing the feature access token to at least one electronic device.

According to another aspect, a method for controlling access to a software asset of a software program, which is executed on an electronic device, is described. The software program may be provided by a service provider. The method comprises, on or by the electronic device, determining that for using the software asset a feature access token, issued by a software provider of the software asset, is required; in reaction to this (i.e., subject to determining that a feature access token is required), requesting the feature access token from a service provider server of the service provider; and receiving the feature access token from the service provider server.

It should be noted that the methods described herein can each be implemented in software and/or computer readable code on one or more processors, in whole or in part of the respective methods.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

According to another aspect, a non-transitory computer-readable storage medium storing one or more programs configured to be executed by one or more processors of an electronic apparatus is described, wherein the one or more programs include instructions for performing the methods which are described in the present document.

According to a further aspect, an electronic apparatus is described, which comprises one or more processors, and a memory storing one or more programs configured to be executed by the one or more processors, the one or more programs including instructions for performing the methods which are described in the present document.

According to another aspect, a software provider server (i.e., a computing device referred to as software provider server) configured to control access to a software asset of a software program, which is executed on an electronic device, is described. The software program may be provided by a service provider. The software provider server is configured to, receive a request for authentication from a service provider server; upon successful authentication, provide an authentication token to the service provider server; receive a request for a feature access token from the service provider server; and in reaction to the request, provide the feature access token to the service provider server, wherein the feature access token may enable the service provider server to provide access to the software asset to one or more electronic devices which are coupled to the service provider server.

According to a further aspect, a service provider server (i.e., a computing device referred to as service provider server) configured to control access to a software asset of a software program, which is executed on an electronic device, is described. The software program may be provided by a service provider. The service provider server is configured to request authentication from one or more software provider servers; in reaction to this (i.e., subject to requesting authentication), receive an authentication token from the one or more software provider servers; in reaction to this (i.e., subject to receiving the authentication token), request a feature access token from the one or more software provider servers, wherein the feature access token may enable the service provider server to provide access to the software asset to one or more electronic devices which are coupled to the service provider server; in reaction to this (i.e., subject to requesting the feature access token), receive the feature access token from the one or more software provider servers; and provide the feature access token to at least one electronic device.

According to another aspect, an electronic device (in particular a client device) configured to control access to a software asset of a software program, which is executed on the electronic device, is described. The software program may be provided by a service provider. The electronic device is configured to determine that for using the software asset a feature access token, issued by a software provider of the software asset, is required; in reaction to this (i.e., subject to determining that a feature access token is required), request the feature access token from a service provider server of the service provider; and receive the feature access token from the service provider server.

According to a further aspect, a system comprising a software provider server, a service provider server, and one or more electronic devices is described.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner. Furthermore, it should be noted that in the present document, the terms "or" or "and/or" should be interpreted as "either or" or "both".

SHORT DESCRIPTION OF THE FIGURES

The invention is explained below in an exemplary manner with reference to the accompanying drawings, wherein FIG. 1 is a block diagram illustrating a typical JWT usage.

Figure 9A:
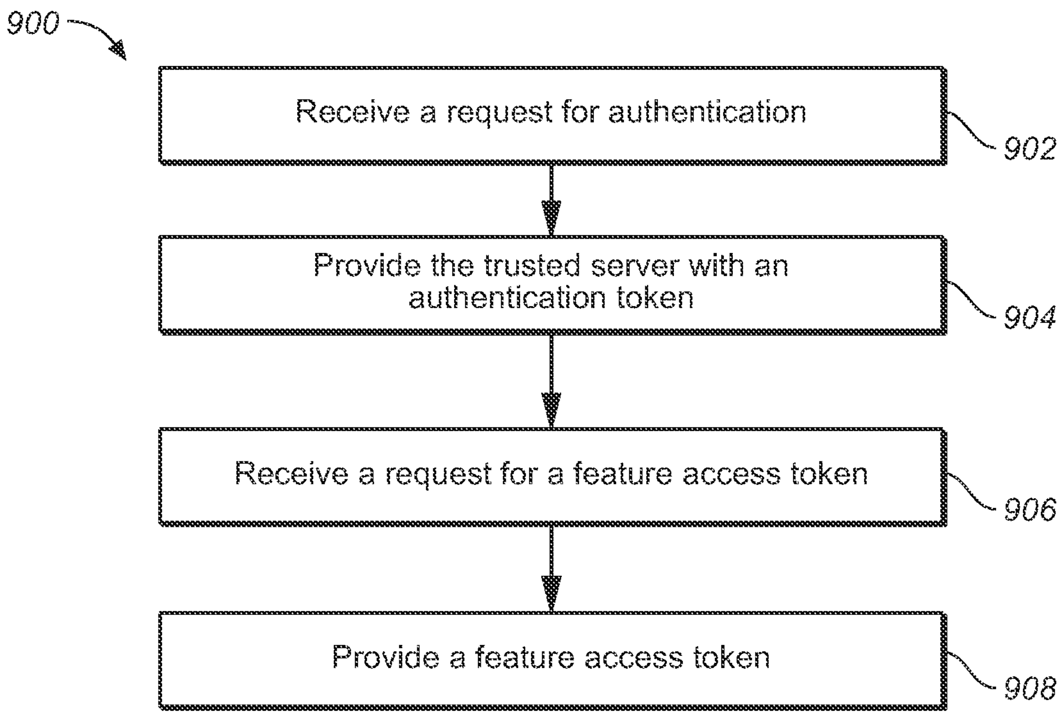

FIG. 9*a* is a flow diagram of a method for providing access to a software asset.

Figure 9B:
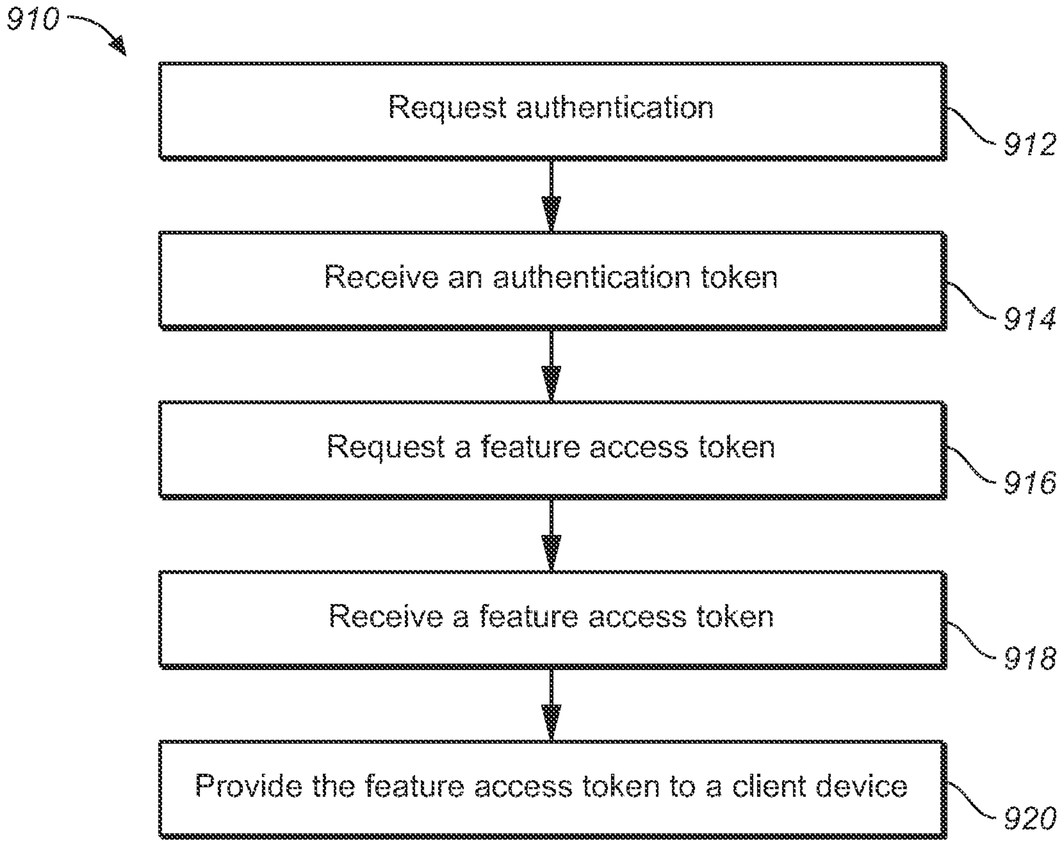

FIG. 9*b* is a flow diagram of a method for requesting access to a software asset.

DETAILED DESCRIPTION

The following description sets forth exemplary methods, parameters and the like. It should be recognized, however, that such description is not intended as a limitation on the scope of the present disclosure but is instead provided as a description of exemplary embodiments.

As indicated above, the present document relates to controlling access to a software asset in an efficient and reliable manner. An example for a software asset is a decoding and/or streaming software (or a part thereof) which may be used by a client device to stream audio and/or video content.

Authorization and client configuration may involve an authorization service (e.g., a third-party providing authorization, authentication, or another security related function or service), an application configuration service, a service provider backend (e.g., the signing service) and/or one or more clients.

A service provider backend (which is also referred to herein as a service provider server) may use a secret key (e.g., provided by a software manufacture or software provider) to obtain an (authentication) access token from the authorization service (which is also referred to herein as a software provider server). This access token enables access to the application configuration service which may store a plurality of different application configurations relevant for the service provider. One application configuration of the plurality of applications configurations may be accessed using a configuration identifier which is constructed from a parameter set that may include (but is not limited to) the usage environment (development vs. production) and/or the region (us-west vs. us-east). For a content delivery related application, the application configuration may serve the following purposes:

- provide system level configuration data to the client. It includes for example, content delivery network (CDN) URLs as well as endpoints for client data logging; and/or
- provide a "pass" of a fixed duration (e.g., a "day pass" for client system access).

It contains the necessary timestamps and signature protection to allow client level verification of the received data and unlocks the functions tied to specific software assets stored at the one or more clients (e.g., a decode operation) for the specified duration. However, this technique may be used to include any kind of configuration data for any type of application (e.g., a non-content delivery related application).

The service provider may cache the application configuration in the service provider backend and may provide the cached data (e.g., the configuration) to a plurality of client devices. Client devices may validate the application configuration including the provided timestamps, check the signature using a key obtained from the signing service and unlock the function (e.g., a decode operation) tied to a specific software asset stored at the one or more client devices for the specified duration.

Figure 1:
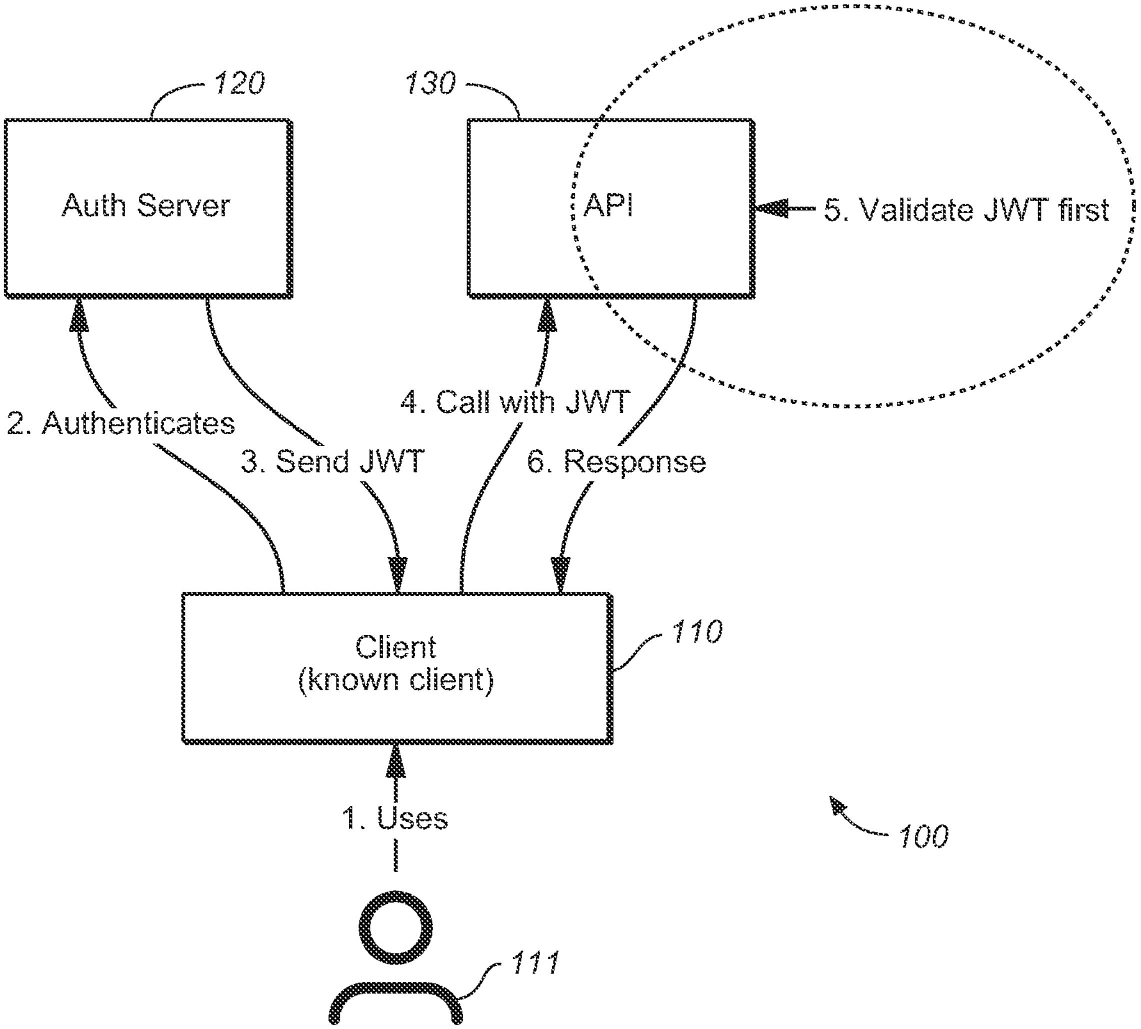

FIG. 1 illustrates a typical use case 100 of a JWT token (which may be referred to in general as a feature access token). As shown in FIG. 1, when a known user 111 uses a client device 110 (e.g., step 1), the client device 110 authenticates the user 111 by sending an authentication request (e.g., step 2) (e.g., with the user's login credentials) to an authorization server 120. In response, the authorization server 120 sends a JWT token to the client device 110 upon successful authentication of the known user 111 (e.g., step 3). Using the JWT token, the client device 110 may send an API call (e.g., step 4) to a server device 130 hosting an API (e.g., running on a server). Upon successful validation of the JWT token at the server device 130 (e.g., step 5), the server device 130 hosting the API returns a response to the API call (e.g., step 6).

The use case 100 of FIG. 1 requires the different client devices 110 to be known to the authorization server 120, which is typically not the case. Typically, client devices 110 are only know to a service provider, but not to a software provider that provides software assets which are used by the client devices 110. Below, FIGS. 2-9*b* illustrate description of exemplary methods for performing the techniques for managing authentication and/or managing access to one or more software assets.

Figure 2:
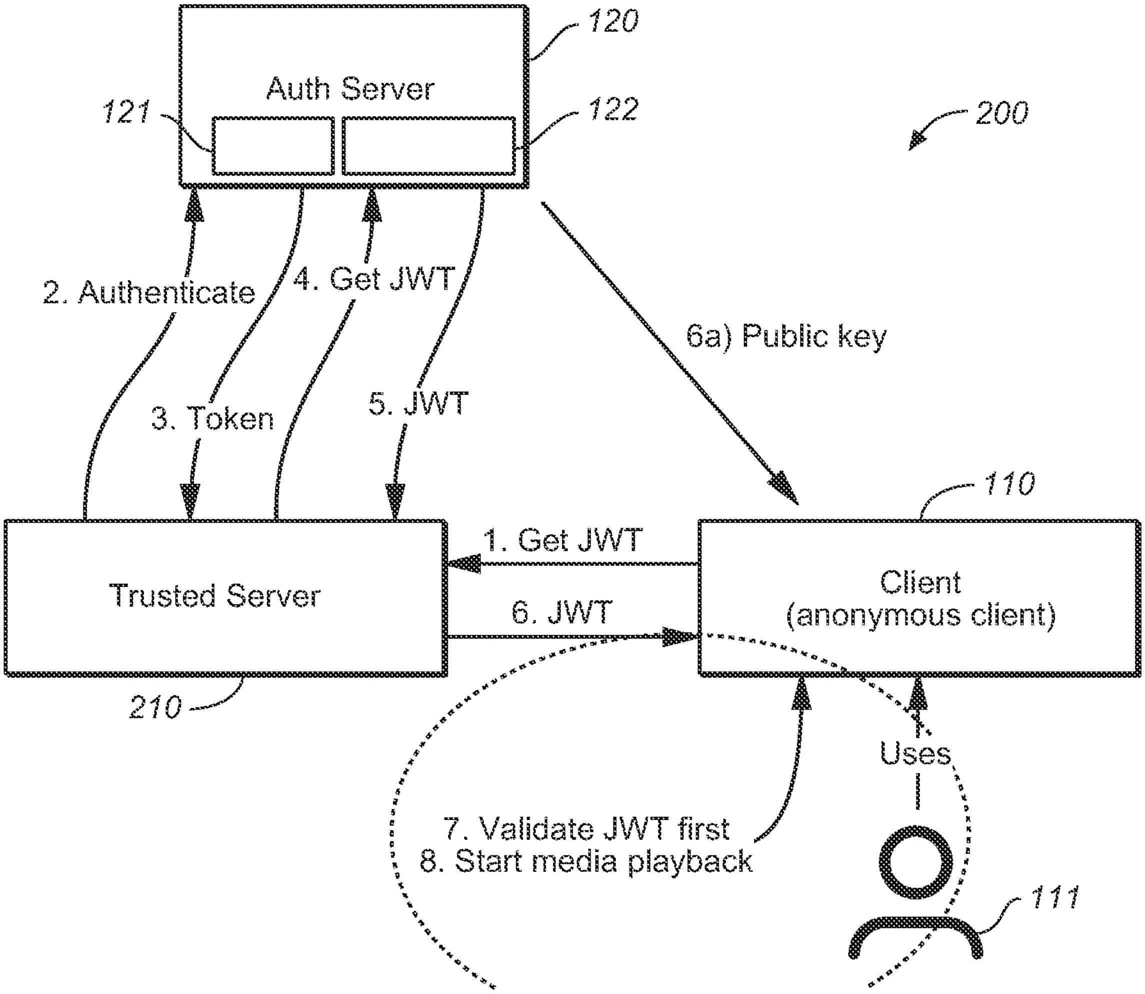
FIG. 2 is a block diagram illustrating a client based JWT validation.

FIG. 2 illustrates an example client side authorization scheme and/or system 200. An anonymous user 111 of a client device 110 (e.g., a smart phone, a tablet, computer, a set top box, a media streaming device, a media playback device, etc.) may use an application (i.e., a software program) on the client device 110 (e.g., interacts with, launches, attempts to initiate media playback, etc.). The scenario in FIG. 2 assumes that the requested use (e.g., function or feature) requires access to one or more local (software) assets on the client device 110 for which authorization is required. An example asset is a decoder for decoding and/or rendering video and/or audio content.

At step 1, the client device 110 initiates the authorization process by requesting an access token (e.g., a JWT token) from a Trusted Server 210 (e.g., a server of an internet-based streaming service provider). The Trusted Server 210 (which is also referred to herein as the service provider server) may be associated with the application which is executed on the client device 110. The Trusted Server 210 may be operated by the service provider (e.g., a service provider for streaming audio and/or video content). The application which is executed on the client device 110 may be provided by the service provider (e.g., to allow users 111 to use the service which is provided by the service provider).

At step 2, the Trusted Server 210 authenticates against an authentication server 120 (e.g., Auth Server), which is referred to herein also as a software provider server. The Auth Server 210 may be a component of a third-party authorization service. The authentication may be performed by an authentication module 121 of the authentication server 120. The authentication server 120 may be operated by the owner (i.e., the software provider) of the software asset (which is required for using the service of the service provider).

In response to a successful authentication, at step 3 the Auth Server 120 transmits (e.g., issues) an access token to the Trusted Server 210. The Trusted Server 210 may be configured to cache the access token locally on the Trusted Server 210 (for being able to interact with the Auth Server 120).

At step 4, the Trusted Server 210 requests a feature access token (e.g., a JWT token associated with a function or feature related to a requested use of the client 110 by a user 111) from the Auth Server 120 (notably from a token module 122 of the Auth Server 120). Rather than request the feature access token from the Auth Server 120, the request may be made directly to a server 122 controlled by the software provider associated with the one or more local assets on the client device 110, for which authorization is required.

At step 5, the Trusted Server 210 receives the requested feature access token. The feature access token may be cached at the Trusted server 210. At step 6, the feature access token may be sent from the Trusted Server 210 to the client device 110 where it is authenticated locally (e.g., step 7) using a public key which has been provided by the Auth Server 120 (e.g., step 6*a*), thereby enabling media playback (e.g., step 8) using the one or more local assets on the client device 110.

Figure 3A:
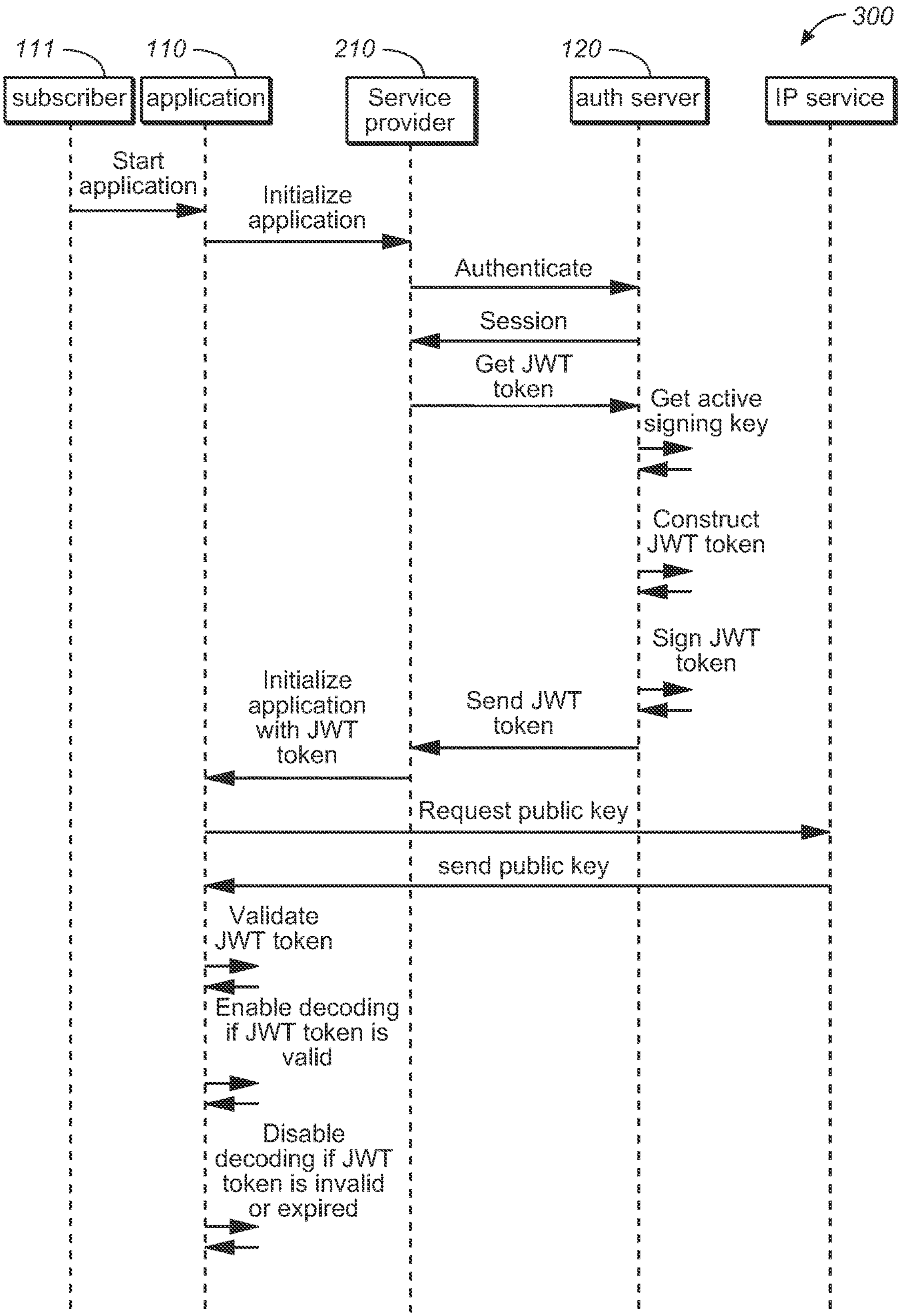
FIG. 3A and FIG. 3B (3B-1, 3B-2, 3B-3) illustrate functional diagrams of a process for managing authorization and usage of a software asset.

FIG. 3A illustrates a detailed process overview 300 for controlling access to a software asset. A user 111 may start a SW application (i.e., a software program) via and/or on an electronic device 110 of the user 111. The SW application may be directed at streaming audio and/or video content. The SW application (i.e., the software program) may then be initialized on the service provider server 210 of a service provider.

The SW application may make use of a particular software asset (which may be controlled by a software provider). In this context, the service provider server 210 may request a feature access token (in particular a JWT token) from an authentication server 120 (i.e., from a software provider server), as outlined e.g., in the context of methods 800, 900, 910.

The service provider server 210 may authenticate itself at the authentication server 120 (using one or more different types of authentication methods). Subject to authentication, the authentication server 120 may enable a session for providing a feature access token. The service provider server 210 may then request a feature access token (notably a JWT token). The request may be sent via a secured channel.

The authentication server 120 may obtain the active signing key for the feature access token (i.e., the digital signature of the feature access token). Furthermore, the feature access token may be constructed and signed (using the active signing key). The (signed) feature access token may then be sent to the service provider server 210, and the feature access token may be used by the service provider server 210 and/or by the electronic device 110 to initialize the SW application with the feature access token.

Figures 1, 3B:
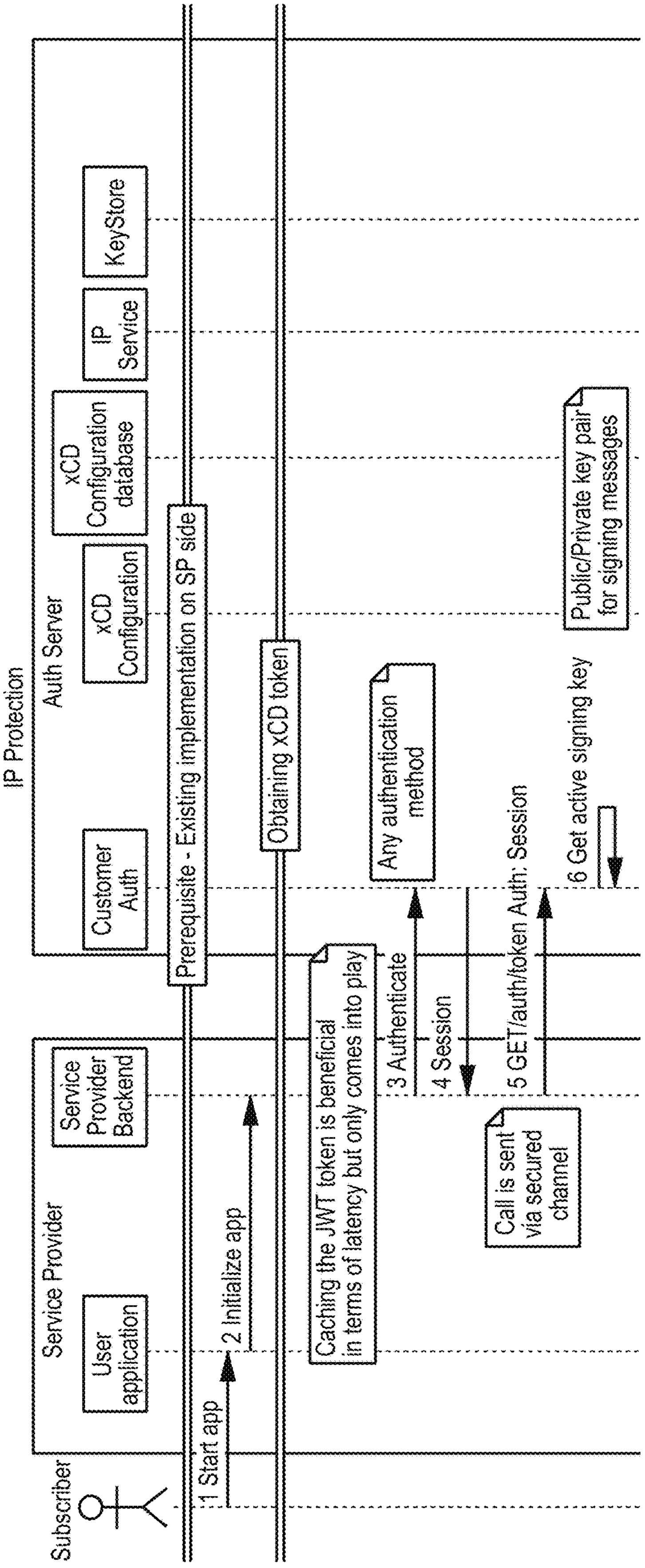
Figures 2, 3B:
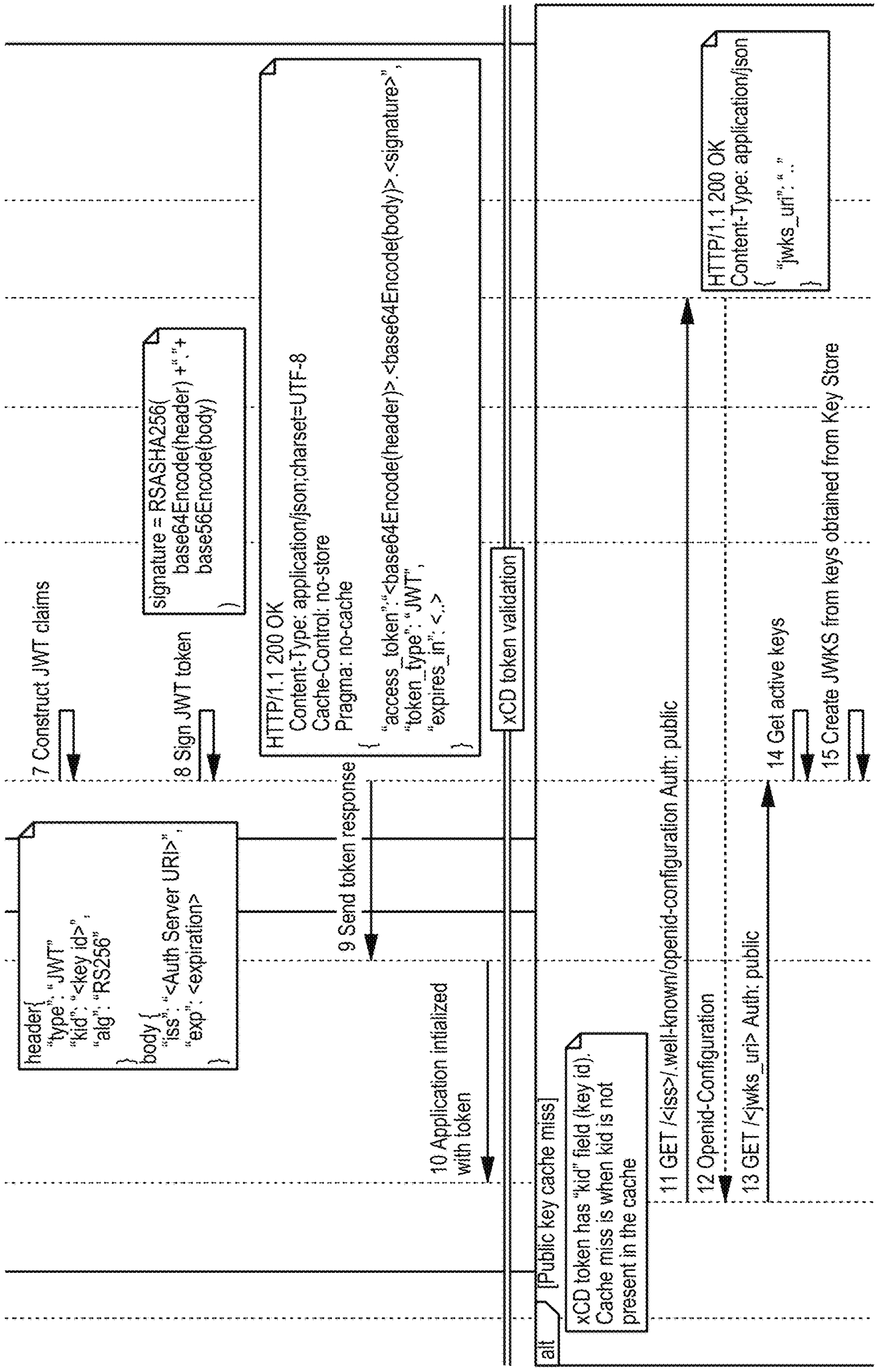
Figures 3, 3B:
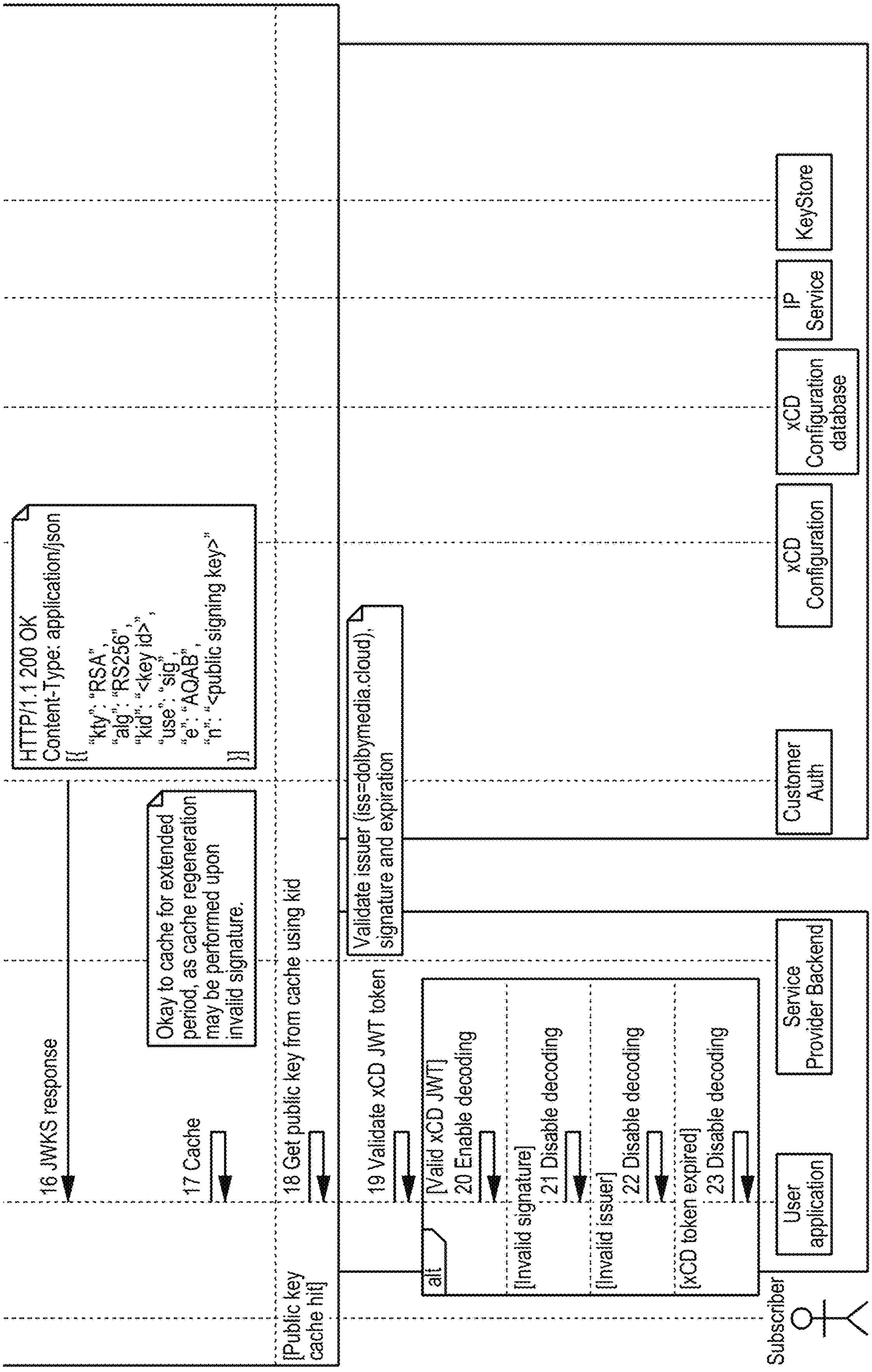

The electronic device 110 may request and receive the public key (i.e., the decryption key) for decrypting the feature access token (e.g., from a central IP service). In this context, the electronic device 110 may verify whether or not the public key is already stored in the cache of the electronic device 110. If the public key is already stored, then the public key does not need to be requested from the IP service. Instead, the stored public key may be used. The public key may be stored indefinitely within the cache of the electronic device 110. If it turns out that the stored public key is invalid, a new public key may be requested (as indicated in FIG. 3A or FIG. 3B). Furthermore, a cache regeneration may be performed, in order to update the public key which is stored in the cache of the electronic device 110.

The feature access token may be validated using the public key. In particular, the issuer signature and/or the expiration date of the feature access token may be validated.

If the feature access token is validated, usage of the software asset may be enabled. In particular, decoding of (audio/video) content using the software asset may be enabled.

On the other hand, if the feature access token is not validated (e.g., due to an invalid signature, due to an invalid issuer and/or due to expiration of the feature access token), usage of the software asset (in particular decoding) may be disabled.

FIG. 3B (3B-1, 3B-2, 3B-3) illustrates a more detailed or extended process overview 300 for controlling access to a software asset. Note that references to "xCD" in FIG. 3B may be interpreted more generally as, for example, referring to software components related to a "User application," which is utilized by "Subscriber" (e.g., as illustrated along the left side of the diagram).

Figure 4:
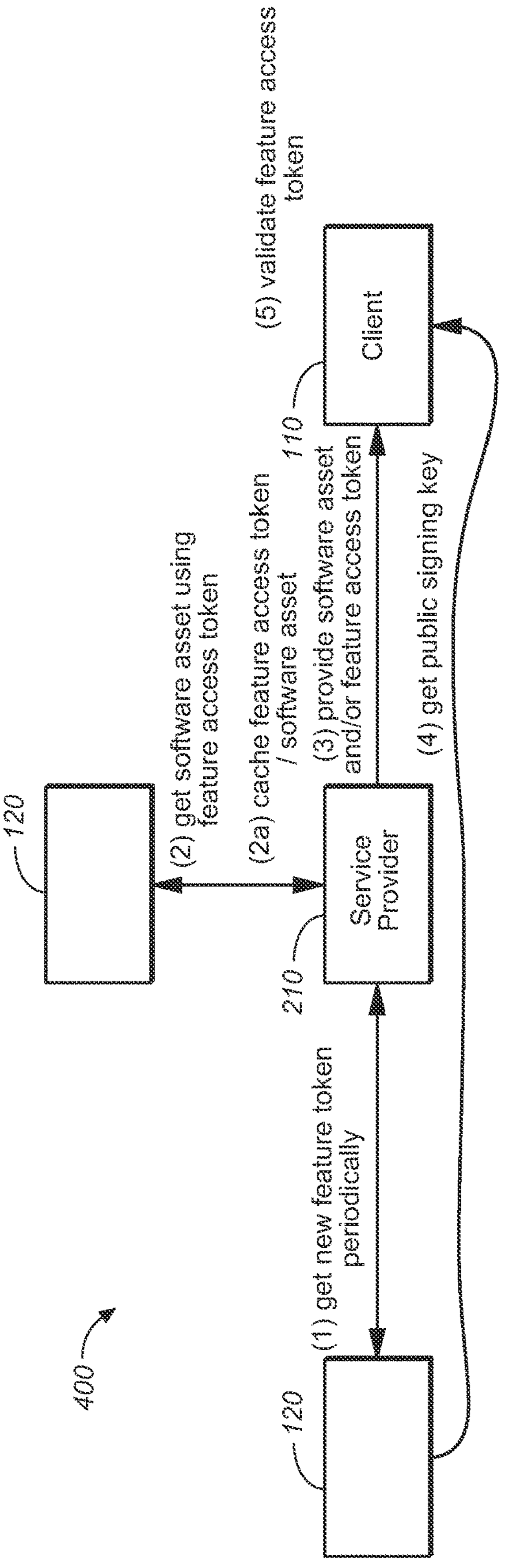
FIG. 4 is a block diagram illustrating a process for managing authorization and usage of a software asset.
Figure 5:
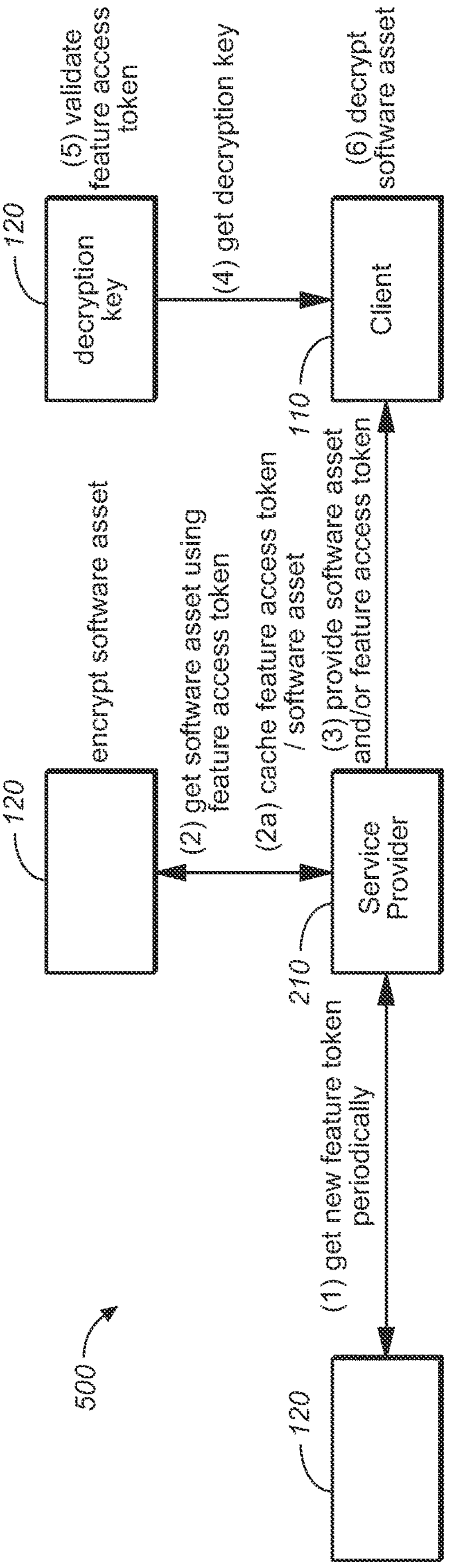
FIG. 5 is another block diagram illustrating a process for managing authorization and usage of a software asset.
Figure 6:
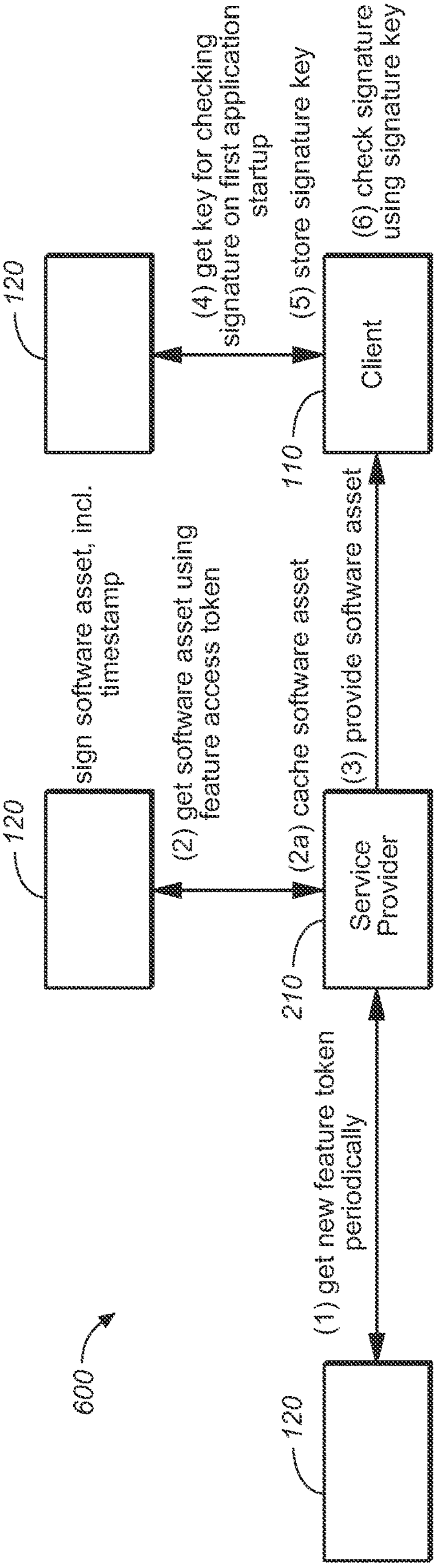
FIG. 6 is another block diagram illustrating a process for managing authorization and usage of a software asset.

FIGS. 4-6 illustrate further details 400, 500, 600 regarding the process 300 of FIG. 3A or FIG. 3B.

FIG. 4 illustrates how the service provider server 210 may request and receive an authentication token from the software provider server 120. This authentication token may be used by the service provider server 210 to access the same or a further software provider server 120 for retrieving the feature access token and/or the software asset. The feature access token and/or the software asset may then be provided to one or more client devices 110. Furthermore, a client device 110 may retrieve a decryption key from the software provide server 120 for verifying and/or decrypting the feature access token and/or the software asset.

FIG. 5 illustrates how the decryption key may be received and used by a client device 110. In particular, a software asset may be encrypted using an encryption key. A decryption key may be provided to the client device 110 to enable the client device 110 to decrypt the software asset, thereby further increasing the security regarding the provision of software assets.

FIG. 6 illustrates how the software asset and/or the feature access token may be signed by the software provider server 120 prior to transferring the software asset and/or the feature access token to the service provider server 210. A public key may be provided to the client device 110 for enabling the client device 110 to verify the signature used for signing the software asset and/or the feature access token, thereby further increasing the security regarding the provision of software assets.

Figure 7:
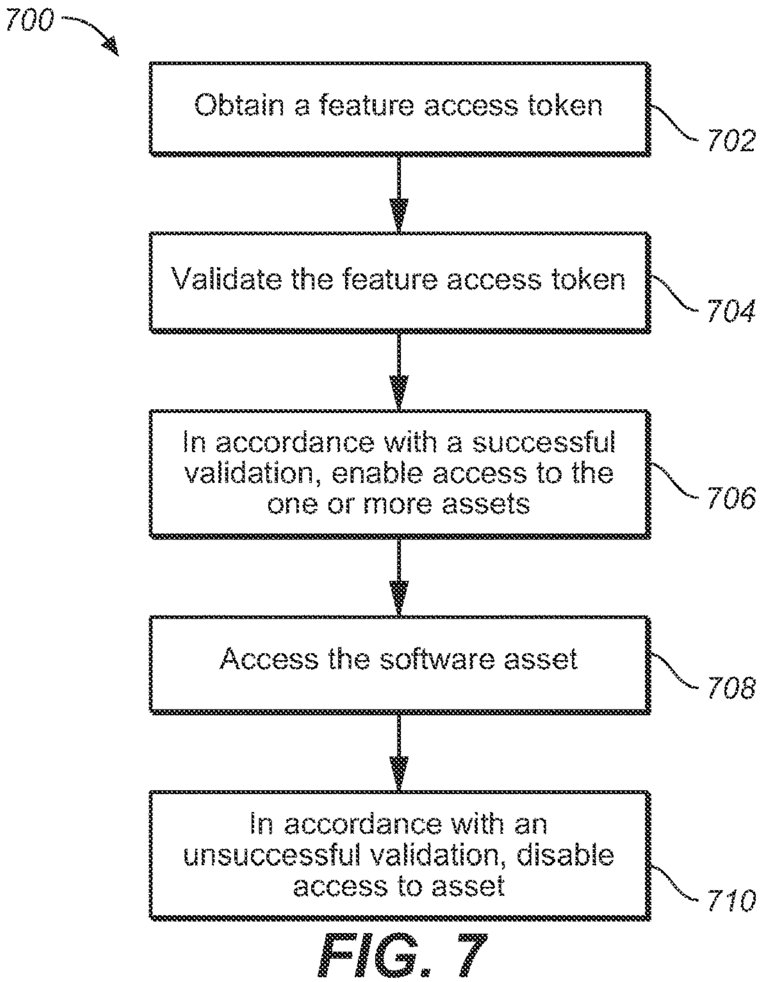
FIG. 7 is flow diagram illustrating a process for managing authorization and usage of a software asset.

FIG. 7 is a flow diagram illustrating a process 700 for managing authorization and usage of a software asset. Process 700 may be performed at an electronic device 110, such as a client device. Some operations in process 700 may be combined, the order of some operations may be changed, and some operations may be omitted. At block 702, the electronic device 110 (e.g., a client device) with one or more processors and a memory storing one or more programs (e.g., applications) for execution on the electronic device 110, obtains a feature access token. The feature access token may be a JWT token. The feature access token may include data associated with a token expiration, data associated with an issuer identification, or a digital signature.

The electronic device 110 may receive configuration data associated with the one or more programs (e.g., applications). The feature access token may include configuration data associated with the one or more programs (e.g., application configuration). The configuration data may be associated with at least one of the sets of: a service provider, a computing environment (e.g., operating system (OS), production, development, etc.), a customer type, and a geographic region. Hence, configuration data may indicate the type of usage of a software asset.

Obtaining a feature access token may include retrieving a feature access token from local storage at or physically connected to the electronic device 110 (e.g., client device). Alternatively, or in addition, obtaining a feature access token may include receiving an access token from a device external to the electronic device 110 (e.g., a server 210 or a device controlled by a service provider entity in communication with the electronic device 110). The feature access token may be received from a service provider backend 210. The feature access token may be received from a software provider server 120 different from the service provider backend 210 (e.g., the software provider server 120 may be controlled by a different entity and/or company than the service provider backend 210). The feature access token may be dependent on and/or limited to the configuration data for which is was requested.

At block 704, the electronic device 110 validates the feature access token. The electronic device may obtain a security key (e.g., a public key) for authenticating (e.g., validating) the feature access token. The security key may be a signing key (e.g., a key based on an asymmetric signing algorithm). The security key may be used by the electronic device 110 to validate the signature associated with the feature access token. The security key may be a public key, a private key, a JWKS (JSON Web Key Set) key, etc.

Obtaining the security key may include retrieving the security key from client local storage or cache. Alternatively, or in addition, obtaining the security key may include receiving the security token from a device external to the electronic device 110 (e.g., an authorization server 120 (e.g., a server controlled by a third party authorization service), a server different than a server controlled by a third party authorization service (e.g., Service Provider)). Validating the feature access token at the electronic device 110 (e.g., the client device) may include using the security key to check (e.g., validate) the signature associated with the feature access token.

The security key may be received from an authorization server 120. Alternatively, or in addition, the security key may be received from a software provider server 120 that is different from a service provider backend 210 and/or different from an authorization server 120.

Validation of the feature access token may be performed periodically. Validation may be performed by the client device 110 at a fixed interval (e.g., every 12 hours, every day, every two days, etc.). Alternatively, or in addition, validation may be triggered by an event (e.g., an initiation or launch of the one or more software programs, an execution of the one or more software programs, in response to a request received at the electronic device 110, etc.).

At block 706, in accordance with a successful validation of the feature access token, the electronic device 110 may enable access, by one or more software programs, to one or more software assets stored on the electronic device 110 and associated with the one or more programs. The one or more software assets stored on the electronic device 110 may include at least a first type of asset selected from the set of: a software library, a portion of a software development kit (SDK), and a decoder (e.g., a network coding/decoder, a media decoder).

Enabling access may include maintaining access. Alternatively, or in addition, enabling access, by the one or more programs, to one or more software assets stored on the electronic device 110 may include: initiating a decryption process on the one or more software assets stored on the electronic device 110, wherein the decryption process is typically different from validating the feature access token.

At block 708, the electronic device 110 while executing the one or more programs, may cause the one or more programs to access the one or more software assets. At block 710, in accordance with an unsuccessful validation of the feature access token, the electronic device 110 may disable access, by the one or more programs, to one or more software assets stored on the electronic device 110. Disabling access may include: maintaining a state wherein the one or more programs are prevented from accessing data associated with the one or more software assets.

It is noted that details of the process 700 are also applicable in an analogous manner to the other methods and/or processes described herein. For example, process 800 (FIG. 8) and/or methods 900, 910 may include one or more of the characteristics described with reference to process 700. For brevity, these details are not repeated below. It should be understood that the particular order in which the operations in FIG. 7 have been described is exemplary and not intended to indicate that the described order is the only order in which the operations could be performed. Additionally, it should be noted that aspects of process 700 (FIG. 7), process 200 (FIG. 2), process 300 (FIG. 3A or FIG. 3B), process 400 (FIG. 4), process 500 (FIG. 5), process 600 (FIG. 6), process 800 (FIG. 8) and/or processes 900, 910 may be incorporated with one another.

Figure 8:
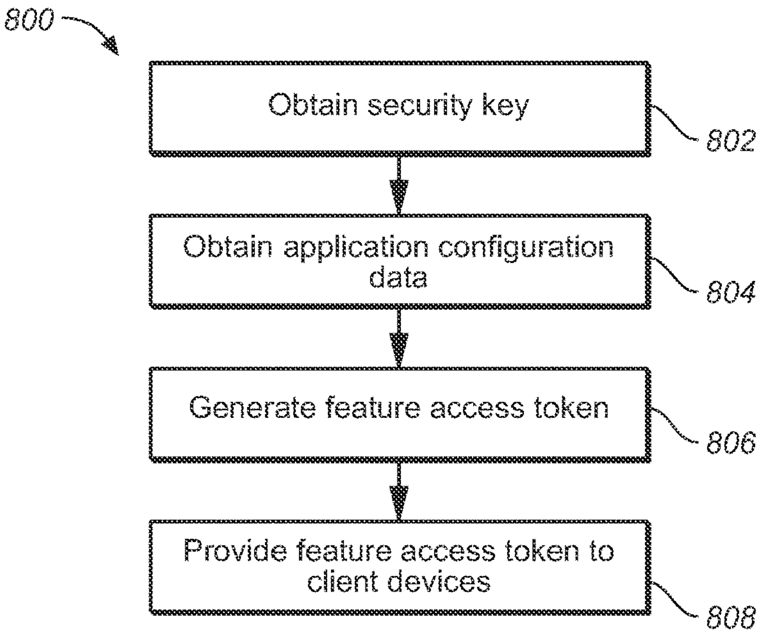
FIG. 8 is flow diagram illustrating a process for managing authorization and usage of a software asset.

FIG. 8 shows a flow diagram illustrating a process 800 for managing authorization and usage of a software asset. Process 800 may be performed at a Trusted Server 210 such as a service provider backend. Some operations in process 800 may be combined, the order of some operations may be changed, and some operations may be omitted.

At block 802, the service provider backend 210 (including a first set of one or more server devices) obtains a security key from a second set of one or more servers 120 controlled by the software provider. The software provider may be controlled by a different business entity than the service provider.

At block 804, the service provider backend 210, using the security key, obtains application configuration data for a service provider application stored on a plurality of client devices 110 in communication with the first set of one or more server devices. Obtaining configuration data may include sending a request to an application configuration server (e.g., an API) using the security key. The application configuration data may be obtained from the second set of one or more servers 120 controlled by the software provider.

At block 806, the service provider backend 210 generates and/or retrieves a feature access token associated with the application configuration data (e.g., a token, which when validated at a client device 110, enables access to one or more software features associated with the service provider application; a JWT token based on data associated with a token expiration, data associated with an issuer identification, and/or a signature). At block 808, the service provider backend 210 provides the app configuration data and the feature access token to one or more client devices 110 connected to the first set of one or more server devices (e.g., to client devices connected to the service provider backend 210), wherein only upon successful validation of the feature access token at the one or more client devices 110, access to a set of features (i.e., to the software asset) associated with the service provider application may be provided.

As outlined above, some techniques for managing authorization and usage of software assets may be cumbersome and inefficient. For example, some techniques may use complex, unsecure, and resource-intensive approaches, which burden software feature integration efforts and waste resources. Some techniques may require more time than necessary, wasting user and developer time, as well as networking and computational resources when operating. The techniques described herein allow software providers to provide software libraries to service providers (e.g., content delivery or stream service providers) and ensure that only authorized end users 111 (e.g., paying customers of the service provider) can use the software libraries.

Accordingly, the aspects which are outlined in the present document provide, inter alia, the benefit of distributed software solutions for execution on end-user devices 110 (e.g., client devices) with faster, more efficient, and more secure methods for managing authorization and usage of software assets. Such methods optionally complement or replace other methods for managing components of distributed software systems. Such methods and techniques reduce the cognitive burden on the developer integrating software into client devices 110 and the user 111 of such client devices 110. Such methods may also reduce the number of unnecessary, extraneous, repetitive, and/or redundant inputs, application calls, enable faster and more efficient deployment over a network of users, and ultimately enable more efficient use by an end user wishing to carry out access-controlled functions on a client device.

In this context, a method 700 for performing client-side authorization is described, which comprises: (at an electronic device 110 with one or more processors and a memory storing one or more programs for execution on the electronic device 110) obtaining 702 a feature access token, validating 704 the feature access token, and in accordance with a successful validation of the feature access token: enabling 706 access, by the one or more programs, to one or more software assets stored on the electronic device 110 associated with the one or more programs, and while executing the one or more programs, causing 708 the one or more programs to access the one or more software assets, and in accordance with an unsuccessful validation of the feature access token: disabling 710 access, by the one or more programs, to one or more software assets stored on the electronic device.

Furthermore, a non-transitory computer-readable storage medium is described. The non-transitory computer-readable storage medium stores one or more programs configured to be executed by one or more processors of an electronic device 110, the one or more programs including instructions for executing the method 700.

Furthermore, an electronic device 110 is described. The electronic device 110 comprises one or more processors; and memory storing one or more programs configured to be executed by the one or more processors, the one or more programs including instructions for executing the method 700.

Furthermore, a method 800 for performing client-side authorization is described, which comprises: (at a first set of one or more server devices 210 controlled by a service provider) obtaining 802 a security key from a second set of one or more servers controlled by a software provider, using the security key, obtaining 804 application configuration data for a service provider application stored on one or more client devices 110 in communication with the first set of one or more server devices 210, generating and/or retrieving 806 a feature access token associated with the application configuration data, and providing 808 the application configuration data and the feature access token to the one or more client devices 110 connected to the first set of one or more server devices 210. Only upon successful validation of the feature access token at the one or more client devices 110, access to a set of features (e.g., to a software asset) associated with the service provider application may be provided.

Furthermore, a non-transitory computer-readable storage medium is described. The non-transitory computer-readable storage medium stores one or more programs configured to be executed by one or more processors of a first set of one or more server devices 210 controlled by a service provider, the one or more programs including instructions for executing the method 800.

Furthermore, a server device 210 is described. The server device 210 comprises one or more processors and memory storing one or more programs configured to be executed by the one or more processors, the one or more programs including instructions for executing the method 800.

The one or more software assets stored on the electronic device 110 may include at least a first type of asset selected from the set of: a software library, a portion of a software development kit (SDK), and a decoder.

The feature access token may be a JSON (JavaScript Object Notation) Web Token (JWT). The feature access token may include data associated with a token expiration, data associated with an issuer identification, and/or a signature. The feature access token may include configuration data associated with the one or more programs (running on a client device 110). The feature access token may be received from a service provider backend 120. Alternatively, or in addition, the feature access token may be received from a software provider server 120 different from a service provider backend 210.

The methods 700, 800 may comprise receiving configuration data associated with the one or more programs. The configuration data may be associated with at least one of the set of: a service provider, a computing environment, a customer type, and a geographic region.

The methods 700, 800 may comprise obtaining a security key (also referred to herein as a decryption key) for authenticating the feature access token. Validating the feature access token at the electronic device 110 may include using the security key to check a signature associated with the feature access token. The security key may be a private key or a public key. Validation may be performed periodically. The security key may be received from an authorization service 120. Alternatively, or in addition, the security key may be received from a software provider server 120 that is different from a service provider backend 210 and/or different from an authorization server.

Enabling access, by the one or more programs, to one or more software assets stored on the electronic device 110 may include: initiating a decryption process on the one or more software assets stored on the electronic device 110, wherein the decryption process is different than validating the feature access token.

FIG. 9*a* shows a flow chart of an example method 900 for controlling access to a software asset of a software program, wherein the software program is executed on an electronic device 110. The software program may be provided by a service provider. The software program may be an app running on a client device 110. The software asset may be part of software enabling streaming and/or decoding of an audio and/or video stream.

The method 900 comprises, e.g., on or by one or more software provider servers 120 (which may be operated by the software provider which provides the software asset), receiving 902 a request for authentication from a service provider server 210 (wherein the service provider server 210 may be operated by the service provider). The service provider server 210 may request authentication using a user name and a password.

The method 900 further comprises, upon successful authentication, providing 904 an authentication token to the service provider server 210 (thereby enabling the service provider server 210 to further interact with the one or more software provider servers 120).

In addition, the method 900 comprises receiving 906 a request for a feature access token from the service provider server 210, and in reaction to the request, providing 908 the feature access token to the service provider server 210. The feature access token may be such that the feature access token enables the service provider server 210 to provide access to the software asset to one or more electronic devices 110 which are (communicatively) coupled to the service provider server 210.

Hence, the feature access token may be provided to the one or more electronic devices 110 indirectly via the service provider server 210, thereby enabling a software provider to control access to unknown electronic devices 110 (which are unknown to the one or more software provider servers 120, but which are known to the service provider server 210) in an efficient and reliable manner.

The feature access token may comprise a digital signature and/or may be encrypted using a digital signature. The method 900 may comprise, on the one or more software provider servers 120, providing a decryption key for validating the digital signature of the feature access token and/or for decrypting the feature access token to the one or more electronic devices 110. In particular, the method 900 may comprise, on or by the one or more software provider servers 120, receiving a request for the decryption key from an electronic device 110, and providing the decryption key to the electronic device 110 in reaction to the request. The decryption key may be a public key which may be provided by the software provider for download. The one or more electronic devices 110 may be enabled to directly retrieve the decryption key from the software provider (without passing through the service provider), thereby further increasing the efficiency of access control.

The method 900 may comprise, e.g., on or by the one or more software provider servers 120, modifying the decryption key used for the digital signature of the feature access token after elapse of a key validity period. By doing this, a particularly reliable and efficient access control may be provided.

The method 900 may comprise, e.g., on or by the one or more software provider servers 120, receiving configuration data from the service provider server 210. The configuration data may be indicative of the software program within which the software asset is to be used. By way of example, the service provider may provide different types of software programs (e.g., for different types of users, such as basic users and high end users). The different types of software programs may be associated with different configuration data.

In addition, the method 900 may comprise proving 908 a feature access token which is dependent on the configuration data, in particular such that the feature access token limits access to the software asset for use within the software program indicated by the configuration data. In other words, the feature access token may be configured to ensure that the software asset is only used within the software program indicated by the configuration data. By taking into account configuration data, the quality of access control may be further increased.

The software provider server 120 for providing the authentication token may be different from the software provider server 120 for providing the feature access token, thereby increasing the flexibility of access control.

FIG. 9*b* shows a flow chart of an example method 800, 910 for controlling access to a software asset of a software program, which is executed on an electronic device 110. The method 800, 910 may be executed by a service provider server 210 of a service provider. The method 800, 910 may be complimentary to the method 900. Furthermore, the method 800, 910 may comprise method steps from method 800.

The method 800, 910 comprises requesting 912 authentication from one or more software provider servers 120 (e.g., using a user name and password). Furthermore, the method 800, 910 comprises, in reaction to this (i.e., in reaction to requesting 912), receiving 914 an authentication token from the one or more software provider servers 120 (which allows the service provider server 210 to interact with the one or more software provider servers 120).

Furthermore, the method 800, 910 comprises requesting 916 a feature access token from the one or more software provider servers 120. The feature access token may enable the service provider server 210 to provide access to the software asset to one or more electronic devices 110 which are coupled to the service provider server 210. The method 800, 910 may further comprise receiving 806, 918 the feature access token from the one or more software provider servers 120.

In addition, the method 800, 910 may comprise providing 808, 920 the feature access token to at least one electronic device 110. In particular, the method 800, 910 may comprise, e.g., on or by the service provider server 210, receiving a request for access to the software asset from an electronic device 110. In addition, the method 800, 910 may comprise, upon authentication of the electronic device 110, providing 808, 920 the feature access token to the electronic device 110. By doing this, a flexible, efficient and reliable access control may be provided.

The method 800, 910 may comprise, e.g., on or by the service provider server 210, receiving configuration data from the electronic device 110, which is indicative of the software program which is executed on the electronic device 110. Furthermore, the method 800, 910 may comprise providing 808, 920 a feature access token to the electronic device 110, which is dependent on the configuration data, in particular such that the feature access token limits access to the software asset for use within the software program indicated by the configuration data. In other words, the feature access token may be configured to ensure that the software asset is only used within the software program indicated by the configuration data. By taking into account configuration data, the flexibility of access control may be further increased.

The method 800, 910 may comprise, e.g., on or by the service provider server 210, caching the feature access token at the service provider server 210 for providing the feature access token to multiple electronic devices 110 requesting access to the software asset. By caching the feature access token, the efficiency of access control may be increased.

Alternatively, the method 800, 910 may comprise, e.g., on or by the service provider server 210, requesting the feature access token from the one or more software provider servers 120 each time a request for access to the software asset is received from an electronic device 110. By doing this, the flexibility of access control may be increased.

The method 800, 910 may comprise, e.g., on or by the service provider server 210, detecting, based on data associated with a token expiration comprised within a feature access token, that the validity of the feature access token cached on the service provider server 210 has elapsed. In addition, the method 800, 910 may comprise, in reaction to this (i.e., in reaction to detecting that the validity of the feature access token cached on the service provider server 210 has elapsed), requesting 916 a new feature access token from the one or more software provider servers 120 (e.g., for caching the new feature access token on the service provider server 210). By doing this, the reliability of access control may be increased.

The method 800, 910 may comprise, e.g., on or by the service provider server 210, providing configuration data to the one or more software provider servers 120. The configuration data may be indicative of the software program within which the software asset is to be used. In addition, the method 800, 910 may comprise receiving 918 a feature access token from the one or more software provider servers 120, which is dependent on the configuration data, in particular such that the feature access token limits access to the software asset for use within the software program indicated by the configuration data. As a result of this, the flexibility and reliability of access control may be increased.

As already outlined in the context of FIG. 7, a method 700 for controlling access to a software asset of a software program, which is executed on an electronic device 110 is described, wherein the method 700 may be executed on an electronic device 110.

The method 700 may comprise, e.g., on or by the electronic device 110, determining that for using the software asset a feature access token, issued by the software provider of the software asset, is required. In reaction to this (i.e., subject to determining that a feature access token is required), the feature access token may be requested from a service provider server 210 of the service provider. Furthermore, the method 700 may comprise receiving 702 the feature access token from the service provider server 210.

The method 700 may further comprise, e.g., on or by the electronic device 110, validating 704 the feature access token. The feature access token may include data associated with a token expiration (e.g., a date or a number of usages) and/or data associated with an issuer identification of the software provider of the software asset and/or configuration data indicative of the software program within which the software asset is allowed to be used. Validating the feature access token may comprise one or more of: verifying (based on the data associated with a token expiration) whether or not the validity of the feature access token has expired; and/or verifying (based on the data associated with an issuer identification) whether or not the feature access token has been issued by the software provider of the software asset; and/or verifying (based on the configuration data) whether or not the software asset is allowed to be used within the software program executed on the electronic device.

Furthermore, the method 700 may comprise, if the feature access token is validated, enabling 706 access to the software asset, and/or, if the feature access token is not validated, preventing 710 access to the software asset. As a result, a particularly reliable access control is enabled.

In other words, the method 700 may comprise determining whether a feature access token issued by a software provider of the software asset is required to use the software asset. In accordance with a determination that a feature access token is required, the feature access token may be requested from a service provider server 210 of the service provider, and the feature access token may be received 702 from the service provider server 210. Furthermore, the method 700 may comprise validating 704 the feature access token, and in accordance with a successful validation, enabling 706 access to the software asset, and in accordance with an unsuccessful validation, disabling 710 access to the software asset. Notably, in scenarios in which it can be assumed that the feature access token issued by the software provider is required, the aforementioned step of determining whether this is the case may be optional.

The method 700 may comprise, e.g., on or by the electronic device 110, requesting a decryption key for validating and/or for decrypting the feature access token from one or more software provider servers 120 of the software provider, and in reaction to the request, receiving the decryption key from the one or more software provider servers 120. Furthermore, the method 700 may comprise validating and/or decrypting the feature access token using the decryption key, thereby further increasing the reliability of access control.

The method 700 may comprise, e.g., on or by the electronic device 110, providing configuration data to the service provider server 210, wherein the configuration data may be indicative of the software program within which the software asset is used. In addition, the method 700 may comprise receiving 702 a feature access token from the service provider servers (210), which is dependent on the configuration data, in particular such that the feature access token limits access to the software asset for use within the software program indicated by the configuration data. As a result of this, the flexibility and/or reliability of access control may be further increased.

Various modifications to the implementations described in this disclosure may be readily apparent to those having ordinary skill in the art. The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The methods, devices, apparatuses and/or systems described in the present document may be implemented as software, firmware and/or hardware. Certain components may e.g. be implemented as software running on a digital signal processor or microprocessor. Other components may e.g., be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g., the Internet. Typical devices making use of the methods and systems described in the present document are portable electronic devices or other consumer equipment which are used to store and/or render audio signals.

Various aspects and implementations of the present disclosure may also be appreciated from the following enumerated example embodiments (EEEs), which are not claims.

EEE1. A method comprising: at an electronic device with one or more processors and a memory storing one or more programs for execution on the electronic device:
- obtaining a feature access token;
- validating the feature access token; and
- in accordance with a successful validation of the feature access token:
  - enabling access, by the one or more programs, to one or more software assets stored on the electronic device associated with the one or more programs; and
  - while executing the one or more programs, causing the one or more programs to access the one or more software assets; and
- in accordance with an unsuccessful validation of the feature access token:
  - disabling access, by the one or more programs, to one or more software assets stored on the electronic device.

EEE2. The method according the EEE1, wherein the feature access token is a JSON Web Token (JWT).

EEE3. The method of any of EEE1-EEE2, wherein the feature access token includes data associated with a token expiration, data associated with an issuer identification, and a signature.

EEE4. The method of any of EEE1-EEE3, wherein the feature access token includes configuration data associated with the one or more programs.

EEE5. The method of any of EEE1-EEE4, further comprising:
- receiving configuration data associated with the one or more programs.

EEE6. The method of any of EEE4-EEE5, wherein the configuration data is associated with at least one of the set of: a service provider, a computing environment, a customer type, and a geographic region.

EEE7. The method of any of EEE1-EEE6, further comprising:
- obtaining a security key for authenticating the feature access token; and
- wherein validating the feature access token at the electronic device includes using the security key to check a signature associated with the feature access token.

EEE8. The method of EEE7, wherein the security key is a private key.

EEE9. The method of any of EEE1-EEE8, wherein validation is performed periodically.

EEE10. The method of any of EEE1-EEE9, wherein the feature access token is received from a service provider backend.

EEE11. The method of any of EEE1-EEE9, wherein the feature access token is received from a software provider server different from a service provider backend.

EEE12. The method of any of EEE7-EEE11, wherein the security key is received from an authorization service.

EEE13. The method of any of EEE7-EEE11, wherein the security key is received a software provider server that is different from a service provider backend and different from an authorization service.

EEE14. The method of any of EEE1-EEE13, wherein enabling access, by the one or more programs, to one or more software assets stored on the electronic device includes: initiating a decryption process on the one or more software assets stored on the electronic device, wherein the decryption process is different than validating feature access token.

EEE15. The method of any of EEE1-EEE14, wherein the one or more software assets stored on the electronic device include at least a first type of asset selected from the set of: a software library, a portion of a software development kit (SDK), and a decoder.

EEE16. A method comprising:
- at a first set of one or more server devices controlled by a service provider:
  - obtaining a security key from a second set of one or more servers controlled by a software provider;
  - using the security key, obtaining application configuration data for a service provider application stored on a plurality of client devices in communication with the first set of one or more server devices;

generating a feature access token associated with the application configuration data; and providing the application configuration data and the feature access token to one or more client devices connected to the first set of one or more server devices, wherein only upon successful validation of the feature access token at the one or more client devices, access to a set of features associated with the service provider application.

EEE17. A non-transitory computer-readable storage medium storing one or more programs configured to be executed by one or more processors of an electronic device, the one or more programs including instructions for performing the methods of any of EEE1-EEE16.

EEE18. An electronic device, comprising:

one or more processors; and a memory storing one or more programs configured to by executed by the one or more processors, the one or more programs including instructions for performing the methods of any of EEE1-EEE16.

The invention claimed is:

1. A method for controlling access to a software asset of a software program executed on an electronic device, the method comprising, on one or more software provider servers:

receiving a request for authentication of a service provider server from the service provider server;

upon successful authentication of the service provider server, providing an authentication token to the service provider server;

after providing the authentication token, receiving a request for a feature access token and configuration data from the service provider server, the configuration data being indicative of the software program within which the software asset is to be used; and in reaction to the request, providing the feature access token to the service provider server, wherein the feature access token is signed and enables the service provider server to provide access to the software asset to one or more electronic devices which are coupled to the service provider server, the feature access token being accessible at the one or more electronic devices where it can be validated locally at the one or more electronic devices using a security key to verify whether the feature asset is issued by a software provider server in the one or more software provider servers, thereby providing access to the software asset on the one or more electronic devices by using the feature access token, wherein the feature access token is provided based on the configuration data such that the feature access token limits access to the software asset for use within the software program indicated by the configuration data.

2. The method of claim 1, wherein:

the feature access token comprises a digital signature or is encrypted using a digital signature; and the security key is a decryption key for validating the digital signature of the feature access token or for decrypting the feature access token.

3. The method of claim 2, further comprising:

receiving a request for the decryption key from an electronic device; and providing the decryption key to the electronic device in reaction to the request.

4. The method of claim 2, further comprising:

modifying the decryption key used for the digital signature of the feature access token after elapse of a key validity period.

5. The method of claim 1, wherein the software provider server for providing the authentication token is different from the software provider server for providing the feature access token.

6. The method of claim 1, further comprising providing the security key to the one or more electronic devices, wherein a first software provider server provides the feature access token and a second software provider server different from the first software provider server provides the security key.

7. The method of claim 1, wherein the software program is executed on the electronic device.

8. A non-transitory computer-readable storage medium storing one or more programs configured to be executed by one or more processors of one or more software provider servers, the one or more programs including instructions for:

receiving a request for authentication of the service provider server from a service provider server;

upon successful authentication of the service provider server, providing an authentication token to the service provider server;

after providing the authentication token, receiving a request for a feature access token and configuration data from the service provider server, the configuration data being indicative of the software program within which the software asset is to be used; and in reaction to the request, providing the feature access token to the service provider server, wherein the feature access token is signed and enables the service provider server to provide access to the software asset to one or more electronic devices which are coupled to the service provider server, the feature access token being accessible at the one or more electronic devices where it can be validated locally at the one or more electronic devices using a security key to verify whether the feature asset is issued by a software provider server in the one or more software provider servers, thereby providing access to the software asset on the one or more electronic devices by using the feature access token, wherein the feature access token is provided based on the configuration data such that the feature access token limits access to the software asset for use within the software program indicated by the configuration data.

9. The non-transitory computer-readable storage medium of claim 8, wherein:

the feature access token comprises a digital signature or is encrypted using a digital signature; and the security key is a decryption key for validating the digital signature of the feature access token or for decrypting the feature access token.

10. The non-transitory computer-readable storage medium of claim 9, further comprising:

receiving a request for the decryption key from an electronic device; and providing the decryption key to the electronic device in reaction to the request.

11. The non-transitory computer-readable storage medium of claim 9, wherein the instructions further comprise:

modifying the decryption key used for the digital signature of the feature access token after elapse of a key validity period.

12. The non-transitory computer-readable storage medium of claim 8, wherein the software provider server for providing the authentication token is different from the software provider server for providing the feature access token.

13. The non-transitory computer-readable storage medium of claim 8, wherein the software program is executed on the electronic device.

14. A software provider server, comprising:

one or more processors; and a memory storing one or more programs configured to be executed by the one or more processors, the one or more programs including instructions for:

receiving a request for authentication of the service provider server from a service provider server;

upon successful authentication of the service provider server, providing an authentication token to the service provider server;

after providing the authentication token, receiving a request for a feature access token and configuration data from the service provider server, the configuration data being indicative of the software program within which the software asset is to be used; and in reaction to the request, providing the feature access token to the service provider server, wherein the feature access token is signed and enables the service provider server to provide access to the software asset to one or more electronic devices which are coupled to the service provider server, the feature access token being accessible at the one or more electronic devices where it can be validated locally at the one or more electronic devices using a security key to verify whether the feature asset is issued by a software provider server in the one or more software provider servers, thereby providing access to the software asset on the one or more electronic devices by using the feature access token, wherein the feature access token is provided based on the configuration data such that the feature access token limits access to the software asset for use within the software program indicated by the configuration data.

15. The software provider server of claim 14, wherein:

the feature access token comprises a digital signature or is encrypted using a digital signature; and the security key is a decryption key for validating the digital signature of the feature access token or for decrypting the feature access token.

16. The software provider server of claim 15, further comprising:

receiving a request for the decryption key from an electronic device; and providing the decryption key to the electronic device in reaction to the request.

17. The software provider server of claim 15, wherein the instructions further comprise:

modifying the decryption key used for the digital signature of the feature access token after elapse of a key validity period.

18. The software provider server of claim 14, wherein the software provider server for providing the authentication token is different from the software provider server for providing the feature access token.

19. The software provider server of claim 14, wherein the software program is executed on the electronic device.

* * * * *